United States Patent [19]

Alderson et al.

[11] Patent Number: 4,785,621
[45] Date of Patent: Nov. 22, 1988

[54] AIR BOTTOMING CYCLE FOR COAL GASIFICATION PLANT

[75] Inventors: Edgar D. Alderson, Ballston Spa, N.Y.; William M. Farrell, Cincinnati, Ohio

[73] Assignee: General Electric Company, Schenectady, N.Y.

[21] Appl. No.: 55,213

[22] Filed: May 28, 1987

[51] Int. Cl.[4] .............................................. F02C 3/28
[52] U.S. Cl. .................................. 60/39.12; 60/39.183; 62/38
[58] Field of Search ............... 60/39.07, 39.12, 39.183; 62/36, 38, 39

[56] References Cited

U.S. PATENT DOCUMENTS

| | | | |
|---|---|---|---|
| 4,019,314 | 4/1977 | Springmann | 60/39.12 |
| 4,224,045 | 9/1980 | Olszewski et al. | 62/38 |
| 4,250,704 | 2/1981 | Bruckner et al. | 60/39.12 |
| 4,341,069 | 7/1982 | Bell et al. | 60/39.12 |
| 4,488,398 | 12/1984 | Noguchi | 60/39.12 |

FOREIGN PATENT DOCUMENTS 208162  1/1987  European Pat. Off. ......... 60/39.183

Primary Examiner—Louis J. Casaregola
Attorney, Agent, or Firm—Jerome C. Squillaro

[57] ABSTRACT

In a coal gasification plant there is a requirement for supplying oxygen to the coal gasifier in order to produce coal gas fuel. An oxygen plant will produce oxygen and nitrogen from an input supply of compressed air. In the presence of a fired gas turbine which is supplied with coal gas fuel, the waste heat from the fired gas turbine may be used to heat compressed air for driving an air cycle turbine. The air cycle turbine in turn drives an air cycle compressor for producing air to the oxygen plant. The nitrogen gas by-product from the oxygen plant is injected into the air cycle for disposal through the air turbine.

11 Claims, 2 Drawing Sheets

AIR BOTTOMING CYCLE FOR COAL GASIFICATION PLANT

BACKGROUND OF THE INVENTION

This invention relates, in general, to power plants which utilize coal gasification technology for producing fuel gas for a gas turbine. This invention further relates, in particular, to the application of an air bottoming cycle to a coal gasification plant with special consideration given to the supply of pressurized air to an oxygen plant and to the useful disposal of nitrogen gas within the air bottoming cycle.

In an integrated coal gasification power plant, a gas turbine is fired by means of coal gas which is produced in a coal gasification plant. Normally such a plant is combined with a steam turbine plant to operate in a combined cycle mode: i.e., a configuration which utilizes steam and gas turbines to produce a power output. However, in such plants there are losses associated with the production of coal gas such as the use of power to drive a boost compressor to provide air to the oxygen plant which, in turn, outputs oxygen which is necessary to the operation of the coal gasification plant. Another consideration relates to the use of nitrogen gas which is a by-product of the production of oxygen in the oxygen plant. Some processes will simply exhaust the nitrogen to atmosphere. Sometimes, air to the oxygen plant will be supplied by a bleed from the gas turbine driven compressor and nitrogen reinjection into the combustor will be attempted in order to compensate for the loss in mass flow.

In U.S. patent application Ser. No. 747,552; filed June 21, 1985 for Air Cycle Thermodynamic Conversion System, the efficiency for a so-called air bottoming cycle (ABC) was demonstrated and fully explained. Briefly, the air bottoming cycle utilizes waste gas heat to heat compressed air where there is a minimal thermal gradient between the two gases, in order to provide motive fluid for an air turbine. The air turbine will drive an air cycle compressor. As applied to the integrated coal gasification cycle, the air bottoming cycle can provide compressed air to the oxygen plant and thereby eliminate the need for a boost compressor as was found necessary in the integrated coal gasification plants of the prior art: and, a useful disposal for a virtually unlimited amount of nitrogen gas by-product is also provided. In addition, the efficiency virtues of the air bottoming cycle are utilized and a special arrangement for a boost gas compressor in connection with the air bottoming cycle is shown.

It is an object of the present invention to apply an air bottoming cycle to an integrated coal gasification power plant and to effect improvements in the efficiency of the coal gasification power plant.

It is another object of the present invention to utilize air bottoming cycle technology to provide compressed air to an oxygen plant in the integrated coal gasification power plant.

It is another object of the present invention to utilize air bottoming cycle technology for the useful application and disposal of nitrogen gas by-product within the air bottoming cycle.

The novel features believed characteristic of the present invention are set forth in the appended claims. The invention itself, however, together with further objects and advantages thereof may best be understood with reference to the following description taken in connection with the accompanying drawings.

SUMMARY OF THE INVENTION

In an integrated coal gasification plant a large supply of oxygen is needed in the practice of the coal gasification process. According to the present invention, this supply of air is generated from a compressor which is driven through an air bottoming cycle. In an air bottoming cycle a supply of waste gas is used to heat a counterflowed supply of compressed air with minimal thermal gradient between the two gases whereas the heated air is used to provide motive fluid for an air turbine which, in turn, drives the air cycle compressor. In one embodiment of the invention, one of the main compressors provides the air for input into the oxygen plant whereas in another embodiment a boost compressor driven by the compressor train provides air at a pressure which is specific to the needs of the oxygen plant. Another feature of the present invention is that the nitrogen gas by-product of the oxygen plant is usefully disposed of in the air turbine cycle by injecting the nitrogen gas into the main compressor flow into the heat exchanger and the air turbine.

DETAILED DESCRIPTION OF THE INVENTION

Figure 1:
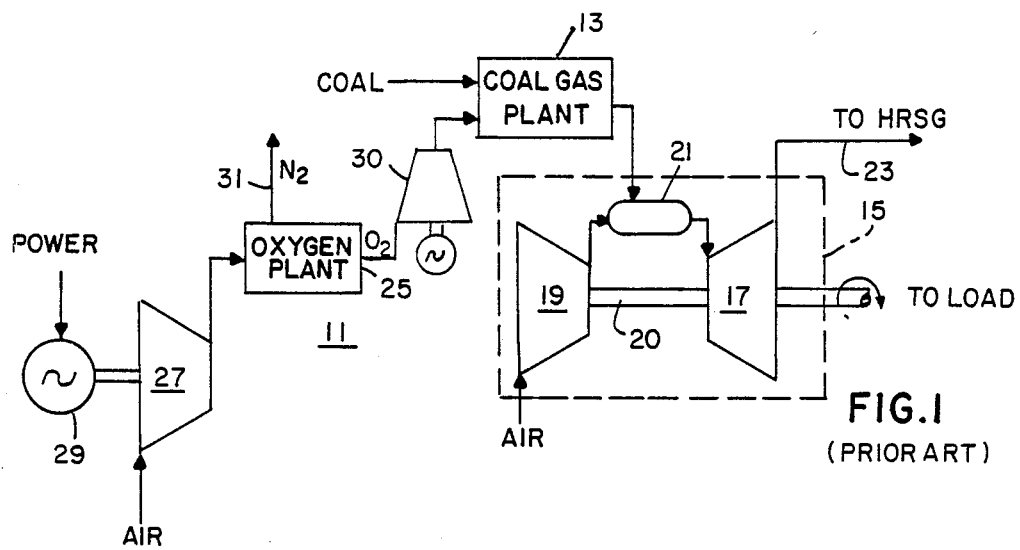
FIG. 1 is a schematic of a prior art coal gasification plant.

A typical integrated coal gasification and combined cycle power plant 11 is shown in FIG. 1 and is more fully explained in U.S. patent application No. 854,370 filed Apr. 21, 1986 for Integrated Coal Gasification Plant and Combined Cycle System with Air Bleed and Steam Injection, a continuation application of U.S. Ser. No. 677,375 filed Dec. 3, 1984 and incorporated herein, by reference. However, a brief explanation insofar as it is pertinent to the present invention will be given here. An integrated coal gasification power plant will include a coal gas plant 13 for converting a coal slurry into coal gas for input into a gas turbine power plant 15 as the primary fuel for running the gas turbine power plant. The gas turbine power plant includes a gas turbine 17 which drives a power plant air compressor 19 which, in turn, supplies combustion air to a plurality of combustors 21 (only one shown). The gas turbine drives the power plant air compressor 19 through a drive shaft 20. Each of the plurality of combustors combines compressor discharge air with the coal gas to produce a combustion mixture which after ignition then becomes the motive fluid for driving the gas turbine. Another aspect of the coal gasification plant may be the direction of hot gas turbine exhaust products to a heat recovery steam generator (HRSG) where it is passed in counterflow heat exchange relationship with feedwater to produce steam for a steam turbine power plant. This process is well known and is therefore simply represented by an arrow 23 indicating TO HRSG.

As has been previously mentioned, the coal gasification plant 13 converts a coal slurry into a coal gas but the process requires a supply of oxygen. The oxygen may be produced in an oxygen plant 25 which is supplied with low pressure compressed air. The compressed air is obtained from a separate compressor 27 which may be driven by an electric motor 29. The air delivered to the oxygen plant is processed into oxygen and nitrogen. The oxygen is further pressurized by a second boost compressor 30 and delivered to the coal gasification plant whereas the nitrogen may be released to the atmosphere as is indicated by the line 31. It should be recognized from the foregoing description that the typical coal gasification plant as described and shown in FIG. 1, requires a power source for the compressor 27 resulting in a power loss, whereas since the nitrogen is lost to the atmosphere the work done in compressing the nitrogen portion of the air is also lost. For this reason, the air compression process for the oxygen plant is usually carried out at lower pressure followed by a boost compressor for further compressing the oxygen component of the oxygen plant output.

Figure 2:
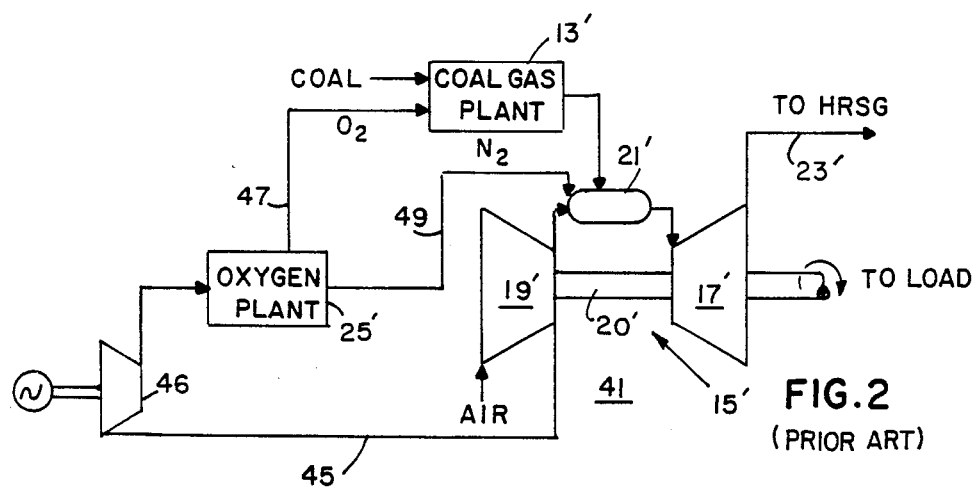
FIG. 2 is a schematic of another prior art coal gasification plant wherein the nitrogen by-product is injected into the combustion chamber.

In FIG. 2, an alternative prior art embodiment is shown to the coal gasification plant 11 shown in FIG. 1. To minimize repetition, like elements to those shown in FIG. 1 are indicated in FIG. 2 with a prime (') symbol. In the FIG. 2 embodiment, an integrated coal gasification combined cycle power plant 41 includes a coal gasification plant 13' which provides fuel gas to a gas turbine combustor 21'. The gas turbine combustor 21' also receives a supply of compressor discharge air for combustion from power plant compressor 19' whereas the combustion products output of the combustor 21' is input into the gas turbine 17' to drive the gas turbine. The gas turbine drives the compressor 19' through drive shaft 20'. The hot exhaust gas from the gas turbine is presented to an HRSG on line 23' which represents the inclusion of a steam power plant as part of an integrated coal gasification and combined cycle plant. As an alternative to the low pressure oxygen plant 25 shown in FIG. 1, compressed air is supplied to a high pressure oxygen plant 25' in the power plant of FIG. 2 by means of an air bleed line 45 which bleeds a portion of the high pressure power plant compressor discharge air and feeds it into a boost compressor 46 feeding oxygen plant 25'. In this way, the use of a separate oxygen boost compressor 30 as shown in FIG. 1 is obviated. The oxygen plant 25' outputs oxygen to the coal gasification plant 13' on line 47 whereas the nitrogen gas is fed directly into the combustor 21' on line 49.

It has been found that the alternative in FIG. 2 is somewhat impractical because to add rejected nitrogen to the combustor flow as an inert non-burning gas, could cause combustion difficulties.

Figure 3:
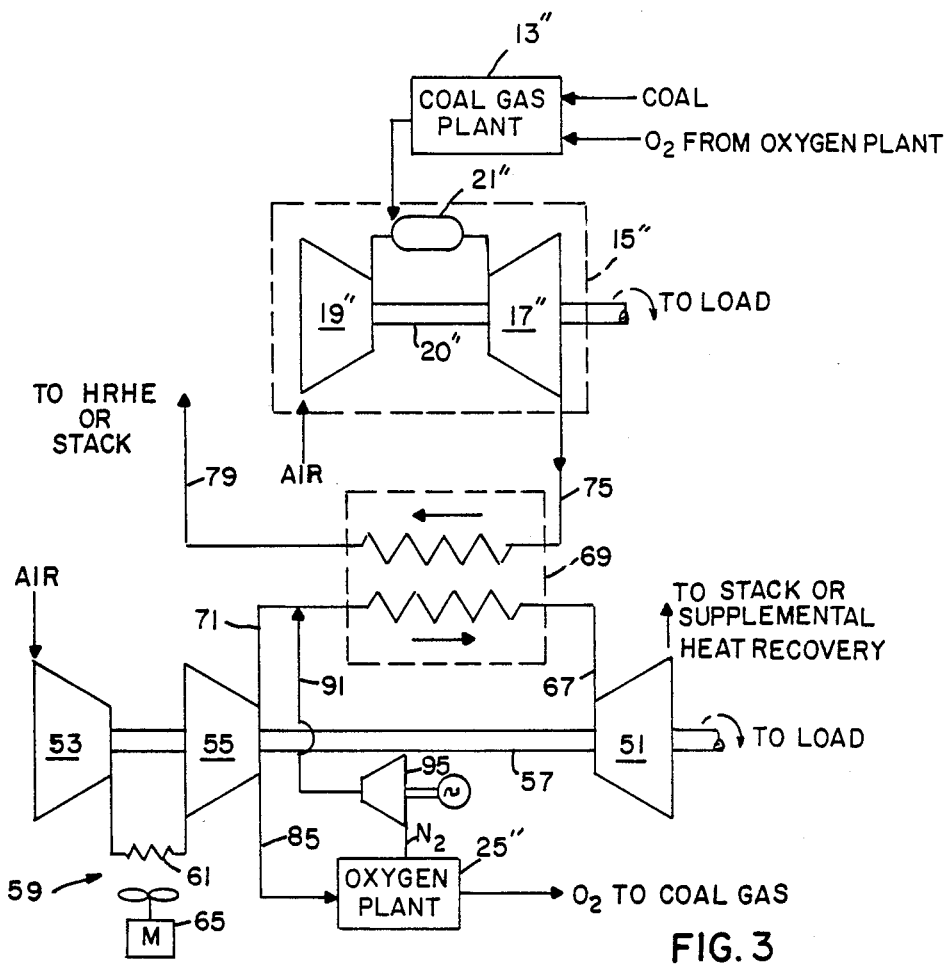
FIG. 3 is a schematic of the present invention including an air bottoming cycle as applied to a coal gasification plant with injection of nitrogen gas into the air bottoming cycle.

The present invention overcomes these difficulties by modifying an air bottoming cycle of the type shown in the heretofore mentioned U.S. patent application No. 747,552; filed June 21, 1985 for an Air Cycle Thermodynamic Conversion System which is incorporated herein by reference. Referring to FIG. 3 wherein like parts are now given a double prime (") designation, a gas turbine power plant 15" includes a power plant compressor 19" driven by a gas turbine 17" through a shaft 20". A plurality of combustors 21", only one of which is shown, provide hot motive fluid to the gas turbine. Fuel for the gas turbine power plant is derived from a coal gasification plant 13" which provides coal gas to the gas turbine combustor.

An air bottoming cycle (ABC) plant includes an air turbine 51; and, first and second air cycle compressors 53 and 55 respectively, both of which are driven by the air turbine from shaft 57. An intercooler 59 is provided between the first 53 and second 55 compressors and includes a heat exchanger 61 with means for providing a cooling fluid flow exemplified by a motor driven air fan 65. The purpose of the intercooler and compressors in the air bottoming cycle is to reduce compressor work and to provide more nearly isothermal compression so that the compressed air is at a low temperature thereby enabling a maximum recovery of waste heat from the exhaust of the gas turbine.

Hot air to the air turbine 51 on line 67 is provided through a combustorless process which employs a heat recovery heat exchanger (HRHE) 69 preferably one which may be construed as a counterflow heat exchanger. Cycle compressor discharge air is input into the HRHE 69 on line 71 whereas gas turbine discharge air is input into the heat exchanger on line 75. Gas turbine exhaust discharge from the heat exchanger may be exhausted to another heat exchange process such as a steam generator or steam turbine power plant on line 79 or to atmosphere. Air for the oxygen plant 25" is supplied through line 85 which represents a bleed from the compressor discharge line. However, it should be noted that this is not a bleed from the main power plant compressor and that the cycle compressor is driven by the air cycle compressor off of what heretofore has been construed as a waste gas flow having a relatively low heating value. If the oxygen plant 25" operates at a pressure higher than the coal gasification plant then no boost compressor is required in the oxygen line but some boost will be required in nitrogen line 91 in the form of electrically driven boost compressor 95. If the oxygen plant operates at a pressure below that of the coal gasification plant, then a boost compressor may be more appropriate in the output of the oxygen plant.

A second valuable result from the application of an air bottoming cycle to the integrated coal gasification plant is the disposal of the nitrogen gas on line 91 back into the air flow through the heat exchanger 69 and hence into the air turbine 51 thereby utilizing the compression work. It has heretofore been noted that a portion of the cycle compressor discharge air has been sent on line 85 to the oxygen plant thus taking away from the compressor discharge flow volume on line 71. Line 91 returns a portion of this bleed air in the form of nitrogen through boost compressor 95 back into the compressor discharge flow thereby adding pressurized gas to the compressor discharge flow. In addition, since the air cycle is basically an unfired cycle there is no stociometric restraint with respect to the reinjection of the nitrogen back into the compressor discharge flow. It should be further noted with respect to FIG. 3 that the exhaust discharge of air turbine 51 may be likewise sent to a further heat recovery heat exchange (HRHE) process in a manner similar to the gas turbine exhaust discharge.

Figure 4:
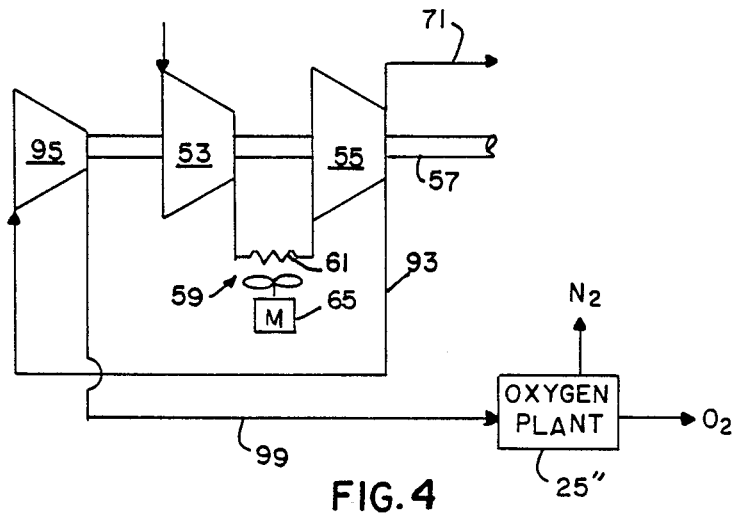
FIG. 4 is a schematic of a modification in the air supply to the oxygen plant according to the present invention.

Finally, referring to FIG. 4, an alternative construction with respect to delivery of compressor discharge air to the oxygen plant is shown within the context of the air bottoming cycle. First compressor 53 and second compressor 55 are mounted on a common shaft 57 driven by an air turbine 51 (see FIG. 3) off of shaft 57. An intercooler 59 cools the air flow from first compressor 53 to second compressor 55 and includes heat exchanger 61 and means for providing a cooling air flow 65 through the heat exchanger. Line 71 provides a flow of compressor discharge air to the heat exchanger 69 (FIG. 3). A bleed line 93 is used to divert a portion of the compressor discharge flow to boost compressor 95 which is also driven off of the common shaft 57 which is also used to drive the first and second cycle compressors 53 and 55 respectively. Compressors 53 and 55 are more nearly sized to the requirements of the air bottoming cycle whereas boost compressor 95 is sized to the requirements of the oxygen plant. The boost compressor discharge is then sent to the oxygen plant on line 99.

In summary of the FIGS. 3 and 4, the air to feed the oxygen plant is extracted from the air bottoming cycle either above gasifier pressure if the air bottoming cycle is operated at high pressure, or by use of a boost compressor if the air bottoming cycle is operated at a pressure ratio similar to the topping gas turbine. The rejected nitrogen is reintroduced into the bottoming cycle before the heat recovery exchanger which produces little effect on the bottoming cycle pressure ratio. In addition, since there is no combustion in the bottoming cycle, the diluent effects of nitrogen as an inert are of no consequence. There is still opportunity to perform heat recovery for steam generation as a supplementary or parallel function.

Having described preferred embodiments of the invention with reference to the accompanying drawings, it is to be understood that this invention is not limited to those precise embodiments and that various changes and modifications may be affected therein by one skilled in the art without departing from the scope of the invention as defined in the appended claims.

What is claimed is:

1. An air bottoming cycle for a coal gasification plant wherein the coal gasification plant includes an oxygen plant for converting pressurized air into oxygen and nitrogen, the oxygen being used in the coal gasification plant: the air bottoming cycle comprising:
    at least one air bottoming cycle first compressor;
    an air turbine connected to drive the first compressor;
    a heat exchanger connected between the first compressor and the air turbine: the heat exchanger for counterflowing the compressor discharge air against a heat source whereby a hot motive fluid is produced for driving the air turbine;
    an air bleed line for transferring a portion of the first compressor discharge air to the oxygen plant; and,
    a return line for injecting nitrogen from the oxygen plant into the first compressor discharge air.

2. The air bottoming cycle recited in claim 1 further comprising:
    a boost compressor driven by the air turbine and connected to the air bleed line between the first compressor discharge and the oxygen plant whereby compressor discharge air may be delivered to the oxygen plant at a pressure which is independent of the air bottoming cycle.

3. The air bottoming cycle recited in claim 1 wherein the return line is connected into the first compressor discharge air at a point between the first compressor and the heat exchanger.

4. The air bottoming cycle recited in claim 1 further comprising a second air cycle compressor connected to the first air cycle compressor and including an intercooler therebetween whereby discharge air from the first compressor is cooled prior to being input into the second compressor and then being sent on to the heat exchanger; and, wherein the air bleed line is connected to the discharge end of the second compressor.

5. An improved power plant of the type including a coal gasification plant for producing fuel gas for a fired gas turbine plant and an oxygen plant for producing oxygen for the coal gasification plant; the power plant further including a nitrogen by-product from the oxygen plant and a hot exhaust waste gas stream from the fired gas turbine plant wherein the improvement comprises:
    an unfired gas turbine plant comprising an air turbine drivingly connected to a first compressor;
    a heat exchanger having a first line connected between the first compressor and the air turbine and a second line connected between the gas turbine plant hot exhaust and an exhaust stack, said first and second lines being in heat exchange relationship whereby compressor discharge air is heated by the hot exhaust waste gas stream;
    an air bleed line connected between the first compressor discharge and the oxygen plant whereby a portion of the compressor discharge air is provided to the oxygen plant; and,
    a return line for injecting nitrogen into the compressor discharge at a point between the compressor discharge and the heat exchanger.

6. The power plant recited in claim 5 wherein the improvement further comprises:
    a second compressor connected to the first compressor so as to be driven by the air turbine;
    an intercooler connected between the discharge of the first compressor and the inlet to the second compressor, the second compressor providing discharge air to the heat exchanger; and, the air bleed line being connected at the discharge end of the second compressor.

7. The power plant recited in claim 5 wherein the improvement further comprises:
    a boost compressor connected to the first compressor so as to be driven by the air turbine; the boost compressor connected at its inlet end to the air bleed line and connected at its discharge end to the oxygen plant whereby compressor discharge air may be delivered to the oxygen plant at a pressure which is independent of the first compressor discharge pressure.

8. The power plant recited in claim 6 wherein the improvement further comprises:
    a boost compressor connected to the second compressor so as to be driven by the air turbine; the boost compressor connected at its inlet end to the air bleed line and connected at its discharge end to the oxygen plant whereby compressor discharge air is provided to the oxygen plant at a pressure independent of the first and second compressors.

9. An apparatus for providing air to an oxygen plant for producing oxygen and by-product nitrogen comprising:
    a first compressor;
    an air turbine drivingly connected to the first compressor;
    a waste heat recovery heat exchanger having a first line connected to a source of heated gas and a second line, in heat exchange relation to the first line and connected at the discharge end of the first compressor and connected to the inlet end of the air turbine for providing heated air to the air turbine;

an air bleed line connected at the discharge end of the first compressor and having its other end connected to the oxygen plant for providing at least a portion of the compressor discharge air to the oxygen plant; and, a return line for injecting nitrogen into the compressor discharge upstream from the air turbine.

10. The apparatus recited in claim 9 further comprising a second compressor connected to the first compressor and driven by the air turbine; an intercooler connected between the discharge end of the first compressor and the inlet end of the second compressor and wherein the second compressor is connected at its discharge end to the heat exchanger and the air bleed line is connected at the discharge end of the second compressor.

11. The apparatus recited in claim 10 further comprising a boost compressor drivingly connected to the air turbine and connected to the air bleed line from the second compressor upstream of the oxygen plant whereby air may be provided to the oxygen plant at a pressure independent of the first and second compressors.

* * * * *